United States Patent [19]

Higashi et al.

[11] Patent Number: 5,465,146
[45] Date of Patent: Nov. 7, 1995

[54] FIXING DEVICE FOR ELECTROPHOTOGRAPHIC APPARATUS

[75] Inventors: Yuichiro Higashi; Youichi Ishikawa, both of Tokyo, Japan

[73] Assignee: Nitto Kogyo Co., Ltd., Tokyo, Japan

[21] Appl. No.: 207,466

[22] Filed: Mar. 8, 1994

[30] Foreign Application Priority Data

Mar. 10, 1993 [JP] Japan .................................. 5-049239

[51] Int. Cl.$^6$ .................................................. G03G 15/20
[52] U.S. Cl. ........................................................ 355/285
[58] Field of Search ................................... 355/282, 285, 355/286, 289, 290, 295; 219/216

[56] References Cited

U.S. PATENT DOCUMENTS

| | | | |
|---|---|---|---|
| 5,115,279 | 5/1992 | Nishikawa et al. | 355/290 |
| 5,149,941 | 9/1992 | Hirobayashi et al. | 355/290 X |
| 5,162,634 | 11/1992 | Kusaka et al. | 355/290 X |

FOREIGN PATENT DOCUMENTS

| | | | |
|---|---|---|---|
| 2-158780 | 6/1990 | Japan | 355/296 |
| 4-50883 | 2/1992 | Japan . | |
| 4-273274 | 9/1992 | Japan . | |
| 4-124267 | 11/1992 | Japan . | |
| 5-11651 | 1/1993 | Japan . | |

Primary Examiner—Fred L. Braun
Attorney, Agent, or Firm—Lowe, Price, LeBlanc & Becker

[57] ABSTRACT

A fixing device to be used in electrophotographic apparatus for providing a clear fixed image with no offset with use of no oil or the least amount of oil, wherein an endless fixing belt provided with a metal body having a release thin film thereon is stretched between a fixing roller having a elastic surface and a heating roller, a pressing roller is arranged to press the surface of the elastic fixing roller upwardly from the lower side thereof through the fixing belt to form a nip portion between the fixing belt and the pressing roller, a guide plate for unfixed image carrying support member is provided underneath the fixing belt, between the heating roller and the nip portion, to form substantially a linear heating path between the guide plate and the fixing belt, and the metal body of the fixing belt has a heat capacity per cm$^2$ within a range of 0.001 to 0.02 cal/°C.

11 Claims, 5 Drawing Sheets

FIXING DEVICE FOR ELECTROPHOTOGRAPHIC APPARATUS

BACKGROUND OF THE INVENTION

1. Field of the Invention

The present invention relates to a fixing device for electrophotographic apparatus, which is used to fix an unfixed toner image on a copy sheet by fusion with pressure.

2. Description of the Prior Art

Many conventional fixing devices for electrophotographic apparatus employ a so-called heating roller method for fixing a toner image. In this method, a heat source is provided inside a pair of rollers coated with a nonsticky material, the rollers are rotated under a suitable pressure therebetween, and a copy sheet onto which a toner image has transferred is passed through the pair of rollers for fixing the transferred toner image.

The recent technology has developed another method wherein a belt is wound around a pair of rollers and a third roller, and a transferred toner image on a copy sheet is then pressed against the surface of the belt with pressure for fixing. Examples of the prior art methods are as follows.

(a) Japanese Laid-open Patent Application No. 4- 50883 discloses a fixing device as shown in FIG. 5, in which a fixing belt c with high thermal conductivity is stretched between and around a heat resisting fixing roller a having an elasticity and a heating support roller b, a pressing roller d is so arranged as to press the fixing roller a upwards through the fixing belt c, and a support member e carrying a transferred unfixed image e' is pressed by the fixing belt c and the pressing roller d for fixing image. This arrangement can prevent the heat resisting and elastic layer on the fixing roller a from peeling off because of the heat of a heater f.

(b) Japanese Laid-open Patent Application No. 4- 273274 discloses another apparatus as shown in FIG. 6, in which a fixing belt $c_1$ is stretched around a heating fixing roller $a_1$ and a support roller $b_1$, a heating pressing roller $d_1$ is arranged to press the fixing belt $c_1$ against the heating fixing roller $a_1$ from the lower side thereof, an image e' on a support member e is fixed between the fixing belt $c_1$ and the pressing roller $d_1$, the support member e is traveled by the fixing belt $c_1$ while cooled at a guide g by a cooling device h and, after the cooling off, the image carrying support member e is separated from the fixing belt $c_1$. This arrangement permits fixation and separation with no offset transfer without using a release agent such as a silicone oil.

(c) Japanese Laid-open Patent Application No. 5-11651 discloses still another device as shown in FIG. 7, which is composed of a fixing roller a, a support roller $b_2$, a fixing belt $c_2$, a pressing roller $d_2$ and a heater f for heating the fixing belt $c_2$. This device further has a conveyer i for conveying an unfixed image carrying support member e arranged in parallel with and underneath the fixing belt $c_2$. In this arrangement, a toner which forms an unfixed image e' is preliminarily heated prior to the fixation. This arrangement lowers the fixation temperature and makes the fixing device simple, compact and lower in cost.

(d) Japanese Laid-open Utility Model Application No. 4-124267 discloses a device in which a main body of a fixing belt consists of a thin metal member. The main body of the belt is smoothly risen or cooled its temperature because of its high thermal conductivity. Thus, a high quality of image can be achieved by the belt type fixing even in the high-speed fixation.

In the conventional device (a), nothing is disclosed as to the technical concept of heating preliminarily the unfixed image carrying support member e with use of the heated fixing belt c. In the conventional device (c), there is disclosed the preheating by the fixing belt $c_2$, however, this prior art specifically concerns to the use of thermal dissociation type capsule toner for fixing the transferred image at low-temperature. Accordingly, the device (c) teaches nothing about the prevention of an offset transfer which may be caused by the use of high-temperature fixation toner.

Further, the conventional device (b) primarily concerns the forced cooling of fixation belt $c_1$ being moved together with the image carrying support member e after fixing. The conventional device (d) concerns self cooling of the fixing belt through its structure while the fixing belt being traveled.

SUMMARY OF THE INVENTION

It is an object of the present invention to provide a fixing device for electrophotographic apparatus which can obtain a clear fixed image without an offset transfer.

In the present invention, a toner is preliminarily heated through a fixing belt prior to fixing, through which a temperature at a nip portion can be set to low. According to the present invention, a high-thermal-conduction belt having a small heat capacity is used as the fixing belt, which allow the cooling of the fixing belt immediately while passing through the nip portion. Therefore, a copy sheet is separated from the fixing belt at the exit of nip portion as being lowered in the temperature of toner on the sheet and a fixed image with no offset transfer can be obtained without utilizing an oil or with the least oil on the belt.

The above objective of the present invention can be achieved by a fixing device for electrophotographic apparatus which comprises:

a fixing roller having an elastic surface;

a heating roller for supplying a heat;

an endless fixing belt consists of a metal body and a release thin film layer formed on a surface thereof, said fixing belt being stretched between the fixing roller and the heating roller, said metal body having a heat capacity per $cm^2$ within the range of 0.001 to 0.02 cal/°C.;

a pressing roller for pressing said fixing roller through the fixing belt, said pressing roller forming a nip portion together with the fixing belt therebetween; and a guide plate disposed between the heating roller and the nip portion for guiding an unfixed image carrying support member to the nip portion, said guide plate forming substantially a linear heating path together with said fixing belt therebetween.

The main body of the metal belt is formed by nickel electroforming and has a thickness of 45 μm.

The release thin film is made of a silicone rubber. A preferable range of thickness of release thin film is 10 to 200 μm. More preferably, the thickness of release thin film is in the range of 50 to 100 μm.

A thickness of the fixing belt is preferably within the range of 0.02 to 0.2 mm. Also, the guide plate is provided with a clearance within the range of 0.5 to 10 mm relative to the fixing belt.

The heating roller is kept at a temperature preferably in the range of 140° to 190° C., more preferably in the range of 150° to 170° C. The pressing roller is kept at a temperature in the range of 100° to 138° C. at the nip portion, more preferably in the range of 108° to 123° C. The fixing belt is kept at a temperature in the heating path preferably in the range of 135° to 185° C., more preferably in the range of 145° to 165° C.

In the present invention, the fixing belt is highly thermally conductive and has a small heat capacity, so that the heat is transferred from the fixing belt to the unfixed image carrying support member at the nip portion, which cools the fixing belt. This lowers the temperature of fused toner, whereby the toner can be surely separated from the fixing belt.

Further objects and advantages of the present invention will be apparent from the following description of the preferred embodiment of the invention as illustrated in the accompanying drawings.

DESCRIPTION OF THE PREFERRED EMBODIMENT

Figure 1:
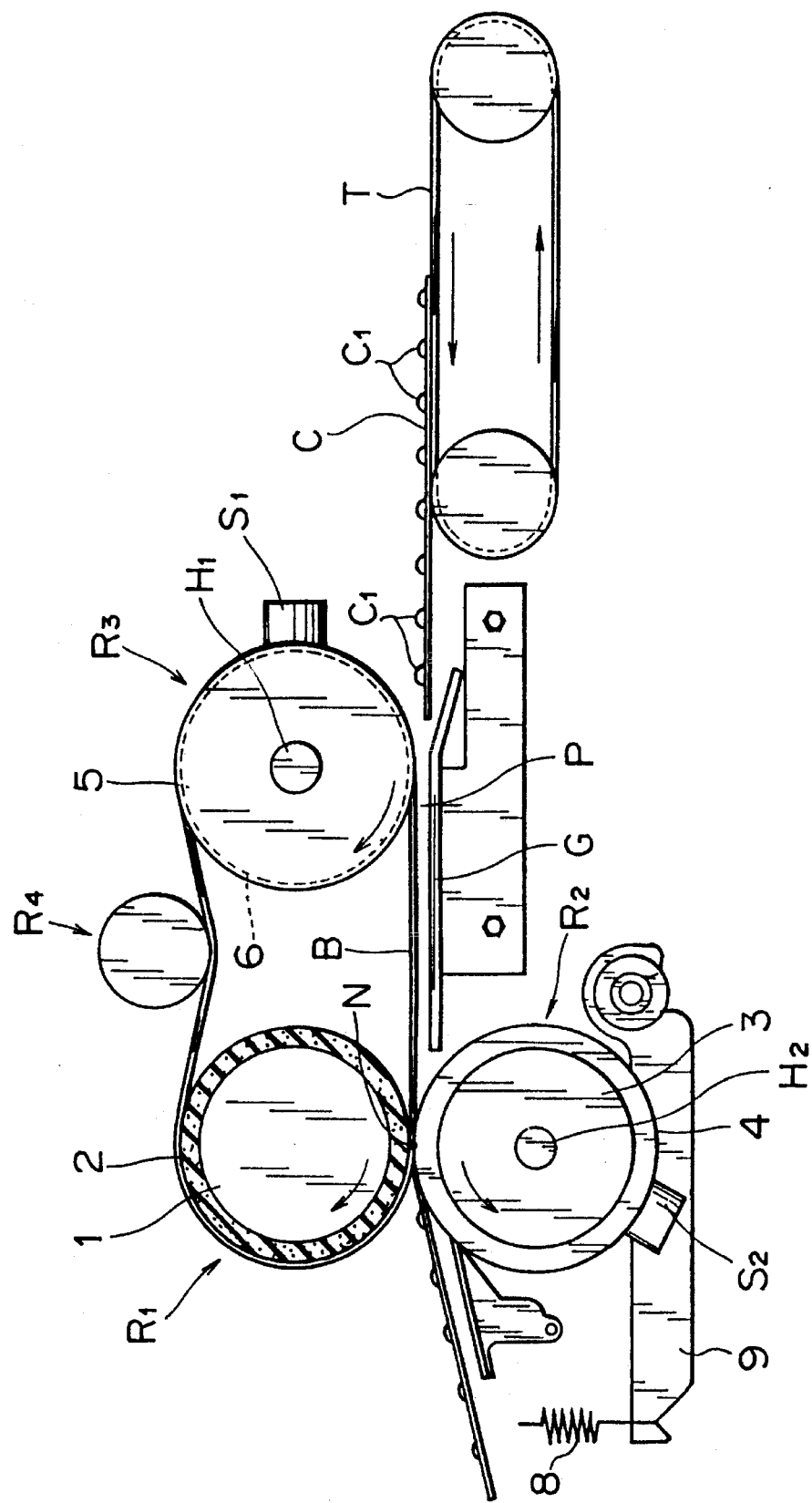
FIG. 1 is a side view to show an embodiment of the present invention.

FIG. 1 shows a fixing device for color copier. In FIG. 1, $R_1$ designates a fixing roller having an elastic surface, $R_2$ designates a pressing roller, $R_3$ designates a heating roller, $R_4$ designates a tension roller, B designates a fixing belt, $H_1$ and $H_2$ designate heat sources, $S_1$ and $S_2$ designate thermistors for temperature control means, G designates a guide plate, and P designates a heating path for unfixed image carrying support member.

The fixing roller $R_1$ having the elastic surface, which has a diameter of 40 mm, is so constructed that a heat resisting elastic coating layer 2 of silicone rubber is formed with a thickness of 3 mm on an aluminum core 1. Also, the pressing roller $R_2$ is so constructed that a heat resisting elastic coating layer 4 of silicone rubber is formed with a thickness of 50 μm on an aluminum core 3 which has a diameter 40 mm. The hardness of the surface of the heat resisting elastic coating layer 2 is set to the same or softer than the hardness of the heat resisting elastic coating layer 4.

Figure 2:
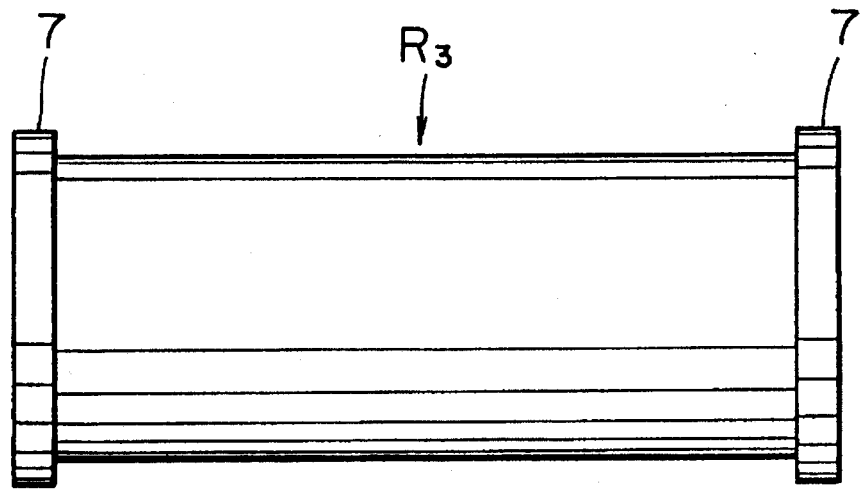
FIG. 2 is a front view of a heating roller in the embodiment.

The heating roller $R_3$ has a Teflon (Trademark) coating layer 6 in thickness of 30 μm on an aluminum core 5 having a diameter 40 mm, which is constructed as a stepped roller having steps 7 which are higher than the thickness of the fixing belt B at the both ends thereof in the axial direction to stop deviation of fixing belt B (see FIG. 2).

The tension roller $R_4$ is formed of an aluminum material having a diameter of 20 mm. The shape of tension roller $R_4$ may be arbitrarily selected from a straight cylinder, an inverted crown, and a normal crown. The tension roller $R_4$ may be arranged also to function to clean the fixing belt or to apply a small amount of oil onto the fixing belt.

Figure 3:
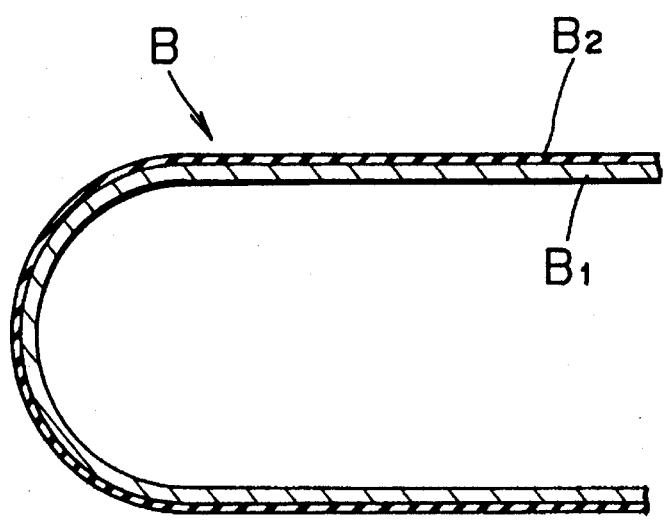
FIG. 3 is an enlarged cross section of a fixing belt in the embodiment.

The fixing belt B is so constructed that a release thin film $B_2$ of silicone rubber is formed with a thickness of 50 μm on the outer surface of endless annular metal belt body having the thickness of 45 μm formed by nickel electroforming process (see FIG. 3). The thickness of fixing belt B is determined within the range of 0.01 to 0.2 mm.

The main heat source $H_1$ is provided at the inside of the heating roller $R_3$. The auxiliary heat source $H_2$ is arranged at the inside of the pressing roller $R_2$. In addition, another auxiliary heat source may be provided with necessity at the inside the fixing roller R1 having the elastic surface.

The thermistor $S_1$ is provided at the outside of the heating roller $R_3$ in the vicinity of the fixing belt B to control the temperature of main heat source $H_1$. Also, the thermistor $S_2$ is provided near by the pressing roller $R_2$.

The guide plate G made of a metal material is arranged underneath the fixing belt B in the proximity of the heating roller $R_3$ ahead of the nip portion N and approximately in parallel with the fixing belt B with a clearance in the range of 0.5 to 10 mm, thus forming a heating path P for the unfixed image carrying support member together with the fixing belt B. The heating path P extends almost linearly from a portion near by the heating roller $R_3$ to the front of the nip portion N.

A pair of springs 8 urge the pressing roller $R_2$ against the fixing roller $R_1$ having the elastic surface through press levers 9. A fixing pressure is set to 66 kg at the nip portion N.

In operation, the fixing belt B moves linearly at a linear velocity of 100 mm/s from the heating roller $R_3$ to the nip portion N which is formed between the surface of the elastic fixing roller $R_1$ and the pressing roller $R_2$. The unfixed image carrying support member C is fed through the heating path P on the guide plate G at the same speed as that of the conveying means T. The support member C is heated by the fixing belt B and the guide plate G which stores thermal energy as being traveled through the heating path P formed on the guide plate G while being kept in a non-contact state with the fixing belt B. The heating conditions are set as follows. The temperature of heating roller $R_3$ is preferably in the range of 140° to 190° C., more preferably in the range of 150° to 170° C. The temperature of fixing belt B in the heating path P is preferably in the range of 135° to 185° C., more preferably in the range of 145° to 165° C. The temperature of pressing roller $R_2$ at the nip portion N is preferably in the range of 100° to 138° C., more preferably in the range of 108° to 123° C. The thermistor S1 controls the temperatures to be within the above ranges. The toner which forms the unfixed image $C_1$ is softened while traveling through the heating path P.

Since the fixing belt B is made thin in order to make the heat capacity smaller, it can be readily heated up to a temperature necessary for fixation at the heating roller $R_3$. After well heated, the fixing belt B reaches to the nip portion N. The support member C carrying the unfixed image $C_1$ is traveled at the same speed as the fixing belt B through the heating path P in contact with the heat-storing guide plate G while, also, heated by a radiant heat from the fixing belt B. Thus, the unfixed image $C_1$ reaches a softened state just before fusing, prior to reaching the nip portion N. The preheating effect permits the unfixed image $C_1$ to melt at the temperature of nip portion N which is lower than that of the conventional fixing device, thus fixing the image.

Since the temperature of nip portion N is set lower than the temperature of fixing belt B, the fixing belt B itself is formed thinner to make a heat capacity small and the fixing roller $R_1$ having the elastic surface has a lower thermal conductivity than the fixing belt B which has a high thermal conductivity, the fixing belt B provides the unfixed image $C_1$ and the support member C with heat during fixation, so that the fixing belt B itself is cooled. Accordingly, the temperature of toner at the exit of nip portion N becomes far lower than that of the conventional roller fixing method. Further, the releasing becomes better between the toner which constitutes the unfixed image $C_1$ and the release thin film $B_2$ of the fixing belt B. Therefore, a fixed image having no offset transfer can be obtained without using any oil or at least using the least oil applied on the belt.

The metal belt body $B_1$ of the fixing belt B has a heat capacity per $cm^2$ in the range of 0.001 to 0.02 cal/°C. Below this range, the heat capacity is too small and then the temperature of heating roller $R_3$ must be set higher. In that case, a thermal load becomes too great on the fixing belt B. While above that range, the heat capacity becomes too large and then a temperature drop in the nip portion N becomes small. In that case, a considerable amount of oil must be applied on the belt to stop occurrence of offset transfer. The thickness of release thin film $B_2$ is in the range of 10 to 200 µm, preferably in the range of 50 to 100 µm. Over 200 µm, thermal responsibility becomes poor, which would result in failing to radiate the heat of metal belt body $B_1$ to the unfixed image $C_1$ and the support member C thereof sufficiently.

Figure 4:
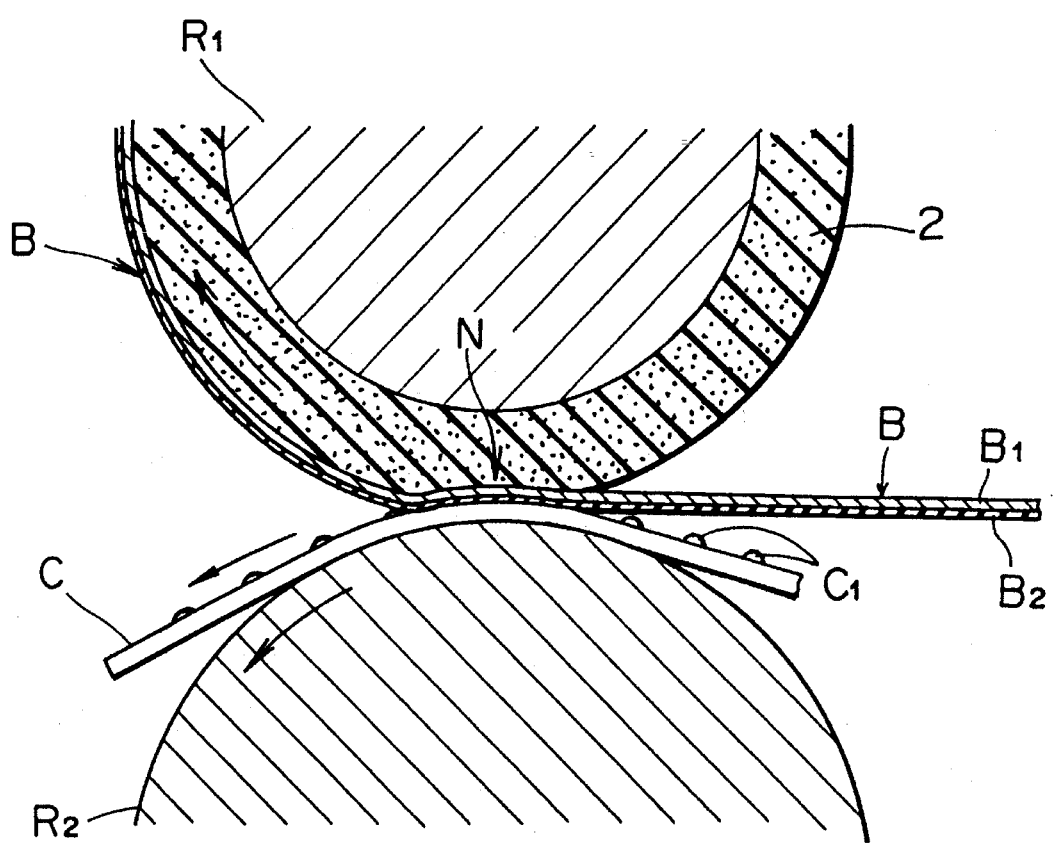
FIG. 4 is an enlarged drawing to illustrate the operation of a nip portion.
Figure 5:
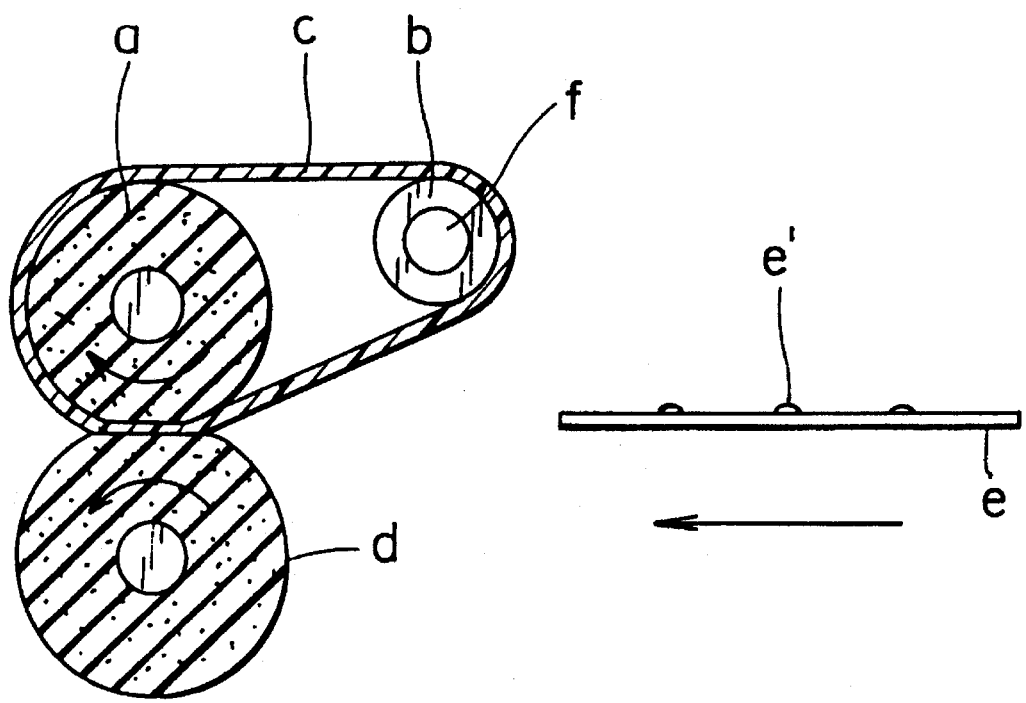
FIG. 5 is an explanatory drawing to show a conventional example.
Figure 6:
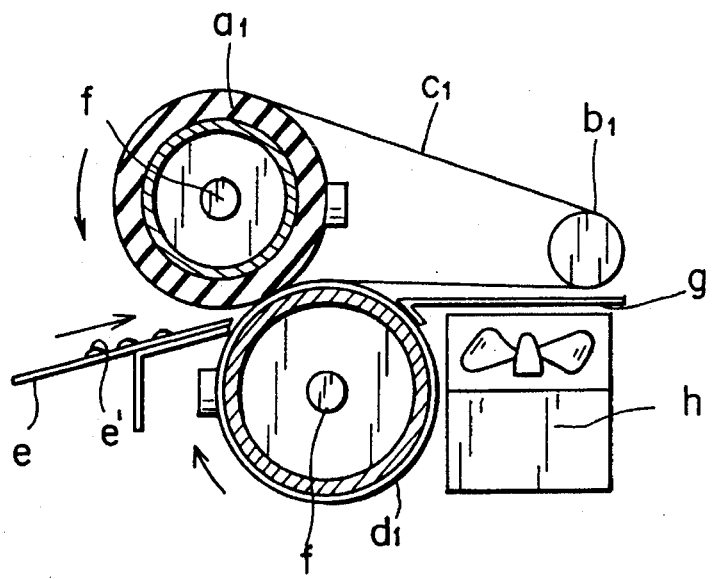
FIG. 6 is an explanatory drawing to illustrate another conventional example.
Figure 7:
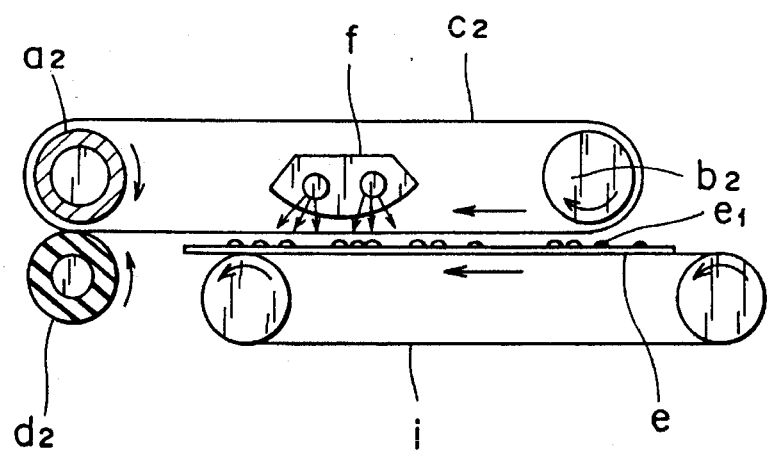
FIG. 7 is an explanatory drawing to illustrate still another conventional example.

The surface hardness of the surface elastic fixing roller $R_1$ is set to the same as or softer than that of pressing roller $R_2$, so that a part of pressing roller $R_2$ and the fixing belt B cut into the elastic surface of the fixing roller $R_1$ at the nip portion N. Accordingly, when the image carrying support member C such as paper leaves the nip portion N, the leaving end thereof is below the horizontal plane and is directed downward on the pressing roller $R_2$ side, which can obviate a separation pawl on the fixing belt B side (see FIG. 4).

In case the pressing roller $R_2$ is too cold when right after the start such as in a cold district, there are caused problems in fixing image. In that case, the auxiliary heat source $H_2$ is brought into operation to heat.

Since the fixing belt B is made of a metal material, it is high in stiffness. Thus, the belt itself is little constricted or waved. Accordingly, the belt can fully stand when the deviating force occurring in the nip portion N is corrected by the step portions 7, which are provided on the heating roller $R_3$ and having the height greater than the thickness of belt, with use of the stiffness of fixing belt B.

Example 1

Experiments were implemented using the above fixing device under the conditions as follows and as listed in the following table.

| Toner used: | toner for Minolta camera CF-70 |
| --- | --- |
| Fixed conditions: | |
| linear speed of fixing belt | 100 mm/s |
| pressing force of pressing roller | 66 kg |
| clearance between fixing belt and guide plate | 3 Mm |
| Structure: | as shown in FIG. 1 |

TABLE

| Ex | Heat roll temp. °C. | Press roll temp. °C. | Nip entr. temp. of fix. belt °C. | Nip exit temp. of fix. belt °C. | Fixation | Offset no oil | Offset with a little oil | Jamming |
| --- | --- | --- | --- | --- | --- | --- | --- | --- |
| 1 | 140 | 100 | 135 | 113 | Δ | o | o | No |
| 2 | 150 | 108 | 145 | 118 | o | o | o | No |
| 3 | 160 | 115 | 155 | 126 | o | o | o | No |
| 4 | 170 | 123 | 165 | 134 | o | o | o | No |
| 5 | 180 | 130 | 175 | 142 | o | Δ | o | No |
| 6 | 190 | 138 | 185 | 150 | o | X | Δ | No |

Guide plate temperature: 84° C. (heat roller: 140° C.) to 115° C. (heat roller: 190° C.)

In the above table, a circle represents a good result, a cross a poor result, and a triangle an acceptable result. In Experiment 6, offset occurs in case of no release agent being used, which is not acceptable. However, by using a small amount of release agent, the occurrence of offset can be eliminated. It is seen from the above table that good or acceptable results were obtained in the other cases. Accordingly, preferable temperature conditions are as follows:

| Heating roller: | 140 to 190° C. |
| --- | --- |
| Pressing roller: | 100 to 138° C. (at nip portion) |
| Fixing belt: | 135 to 185° C. (at the entrance of nip portion) |

More preferable temperature conditions are as follows:

| Heating roller: | 150 to 170° C. |
| --- | --- |
| Pressing roller: | 108 to 123° C. (at nip portion) |
| Fixing belt: | 145 to 165° C. (at the entrance of nip portion) |

Example 2

Another experiments were conducted by using the fixing device of the present invention as well as a conventional fixing device employing the roller fixing method. An image was fixed on an OHP sheet by the fixing device of the present invention or by the conventional fixing device. The toner used was the one for Minolta camera CF-70. The conventional fixing device was the one in the camera CF-70. The fixing results were compared between the two fixing devices by measuring the transmittance of OHP.

Results in measuring the transmittance of OHP are as follows.

Total transmittance: No difference was observed between the roller fixation and the belt fixation.

Transmittance: The belt fixation showed 2 to 3 times higher in value than those of the roller fixation for the colors.

Turbidity: The turbidity by the belt fixation was about one half of that of the roller fixation in each color.

The above results show that the belt/toner surface temperature in belt fixation is lowered at the time of discharging the sheet as compared to that of the roller fixation. Since the cohesive force of toner is stronger and that the toner is not pulled by the fixing belt, thus resulting in a smooth toner surface.

As described above, the fixing device of the present invention is so arranged that the endless fixing belt being provided with the release thin film on the surface of the metal body is stretched between the fixing roller having the elastic surface and the heating roller, the pressing roller is arranged to be pressed against the fixing roller having the elastic surface from the lower side thereof through the fixing belt to form the nip portion between the fixing belt and the pressing roller. The guide plate for unfixed image carrying support member is provided underneath the fixing belt, between the heating roller and the nip portion, to form the nearly linear heating path between the guide plate and the fixing belt, and the metal body of the fixing belt has a heat capacity per cm$^2$ in the range of 0.001 to 0.02 cal/°C. In this arrangement, the preheating effect in the heating path lowers the fixing temperature at the nip portion, and the self cooling of the fixing belt having the small-heat-capacity at the nip portion decreases the temperature of unfixed image carrying support member so as to enhance release of image from the fixing belt, whereby a fixed image with no offset can be obtained without using oil or with use of the least amount of oil on the fixing belt.

Many modifications of the embodiments may be made without departing from the spirit and scope of the present invention. It should be understood that the present invention is not limited to the specific embodiments described in the specification.

What is claimed is:

1. A fixing device for electrophotographic apparatus, comprising:

a fixing roller having an elastic surface;

a heating roller for supplying a heat;

an endless fixing belt comprising a metal body and a release thin film formed on a surface thereof, said fixing belt being stretched between the fixing roller and the heating roller, said metal body having a heat capacity per cm$^2$ in the range of 0.001 to 0.02 cal/°C.;

a pressing roller for pressing said fixing roller through the fixing belt, said pressing roller forming a nip portion together with the fixing belt therebetween; and a guide plate disposed between the heating roller and the nip portion to guide an unfixed image carrying support member to said nip portion, said guide plate forming substantially a linear heating path together with said fixing belt.

2. A fixing device according to claim 1, wherein said metal body is formed by nickel electroforming.

3. A fixing device according to claim 1, wherein said metal body has a thickness of 45 μm.

4. A fixing device according to claim 1, wherein said release thin film is made of a silicone rubber.

5. A fixing device according to claim 1, wherein said release thin film has a thickness within a range of 10 to 200 μm.

6. A fixing device according to claim 1 wherein said release thin film has a thickness within a range of 50 to 100 μm.

7. A fixing device according to claim 1, wherein said fixing belt has a thickness within a range of 0.01 to 0.2 mm.

8. A fixing device according to claim 1, wherein said guide plate is arranged with a clearance within a range of 0.5 to 10 mm relative to the fixing belt.

9. A fixing device according to claim 1, wherein said heating roller is kept at a temperature within a range of 140° to 190° C.

10. A fixing device according to claim 1, wherein said pressing roller is kept at a temperature within a range of 100° to 138° C. at the nip portion .

11. A fixing device according to claim 1, wherein said fixing belt is kept at a temperature within a range of 135° to 185° C. in the heating path.

* * * * *

UNITED STATES PATENT AND TRADEMARK OFFICE
CERTIFICATE OF CORRECTION

PATENT NO. : 5,465,146
DATED : November 7, 1995
INVENTOR(S) : Yuichiro HIGASHI et al It is certified that error appears in the above-indentified patent and that said Letters Patent is hereby corrected as shown below:

On the title page, delete item [30], insert correct item:

--[30]    Foreign Application Priority Data

Mar. 10, 1993 [JP] Japan . . . . . . . 5-049232--

Signed and Sealed this

Second Day of April, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,465,146
DATED        : November 7, 1995
INVENTOR(S)  : Yuichiro HIGASHI, et al It is certified that error appears in the above-indentified patent and that said Letters Patent is hereby corrected as shown below:

On the title page, delete item [30],
--[30]      Foreign Application Priority Data
   Mar. 10, 1993  [JP]   Japan . . . . . . . 5-049239--

This certificate supersedes Certificate of Correction issued April 2, 1996.

Signed and Sealed this

Eighth Day of October, 1996

Attest:

BRUCE LEHMAN

*Attesting Officer*      Commissioner of Patents and Trademarks